Feb. 16, 1971 A. W. ANDERSON 3,563,880
GEL ELECTROPHORESIS UNIT
Filed Aug. 28, 1968 3 Sheets-Sheet 1
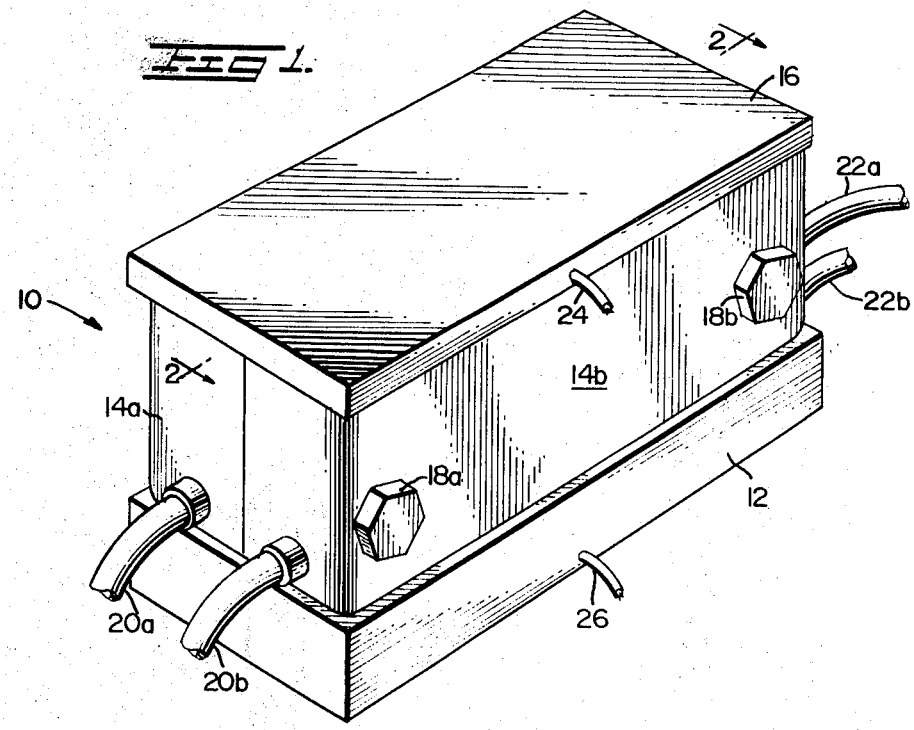
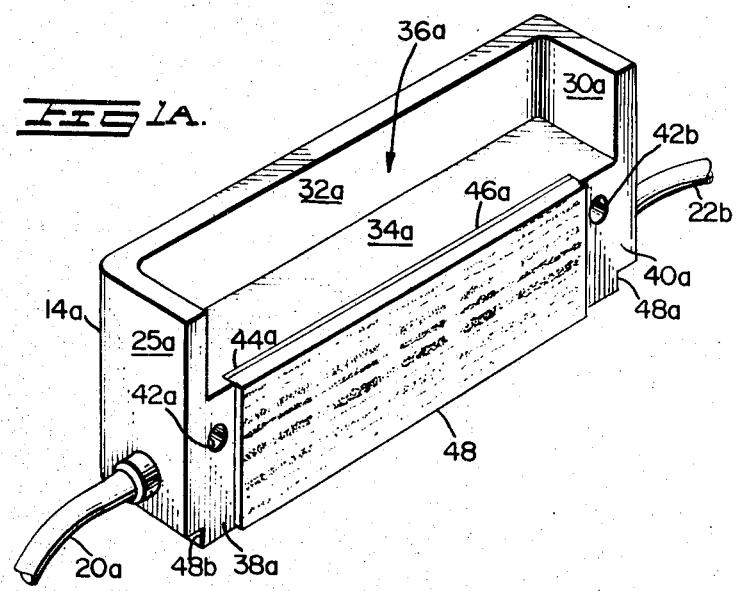
INVENTOR
ARTHUR W. ANDERSON
Stowell & Stowell
ATTORNEYS Feb. 16, 1971  A. W. ANDERSON  3,563,880
GEL ELECTROPHORESIS UNIT
Filed Aug. 28, 1968  3 Sheets-Sheet 2
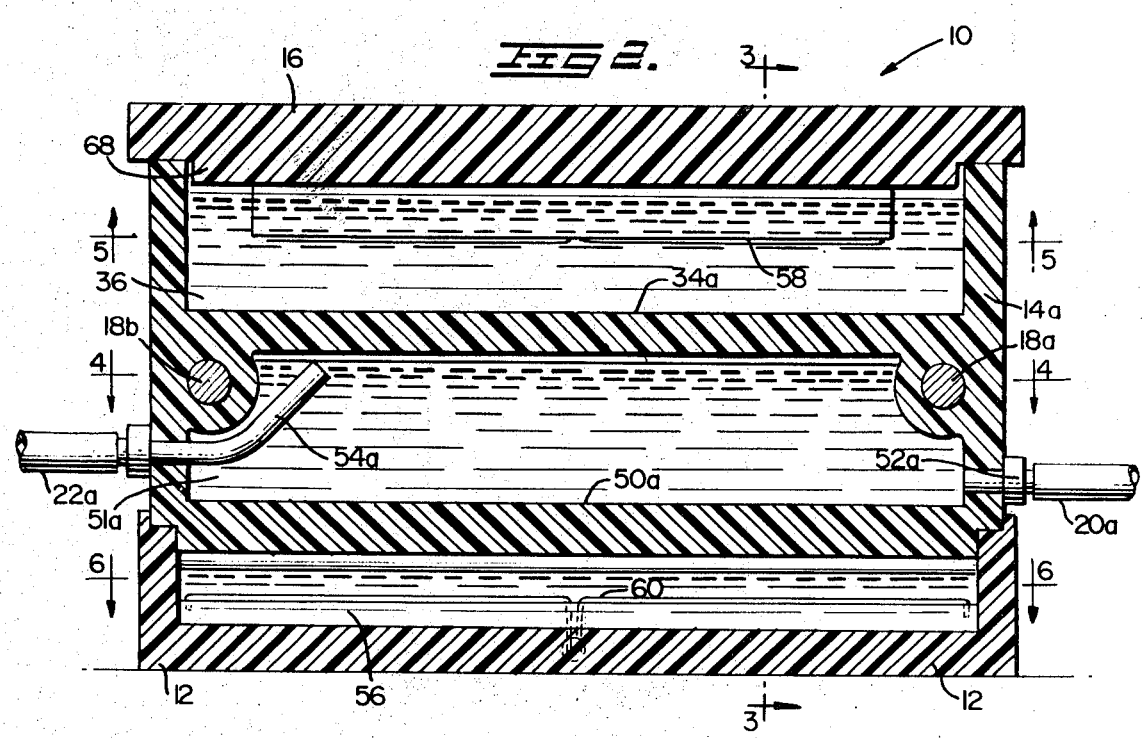
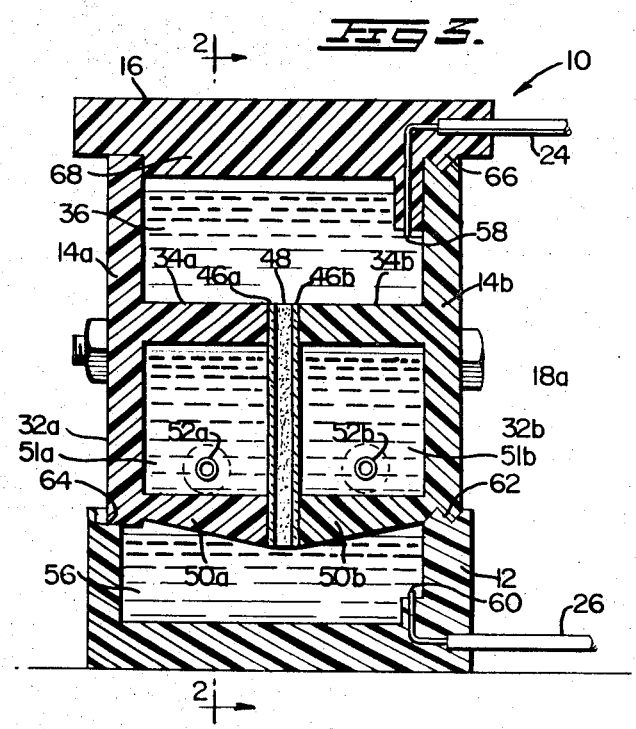
INVENTOR
ARTHUR W. ANDERSON
Stowell & Stowell
ATTORNEYS

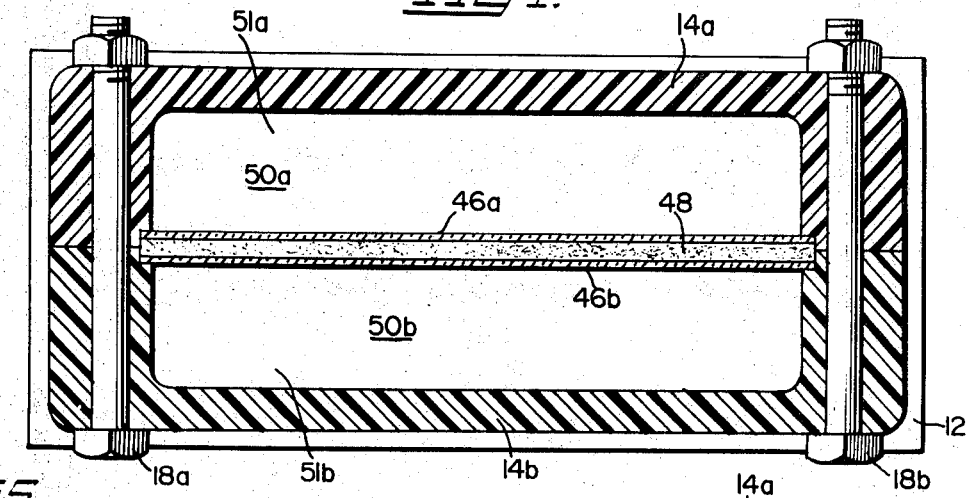
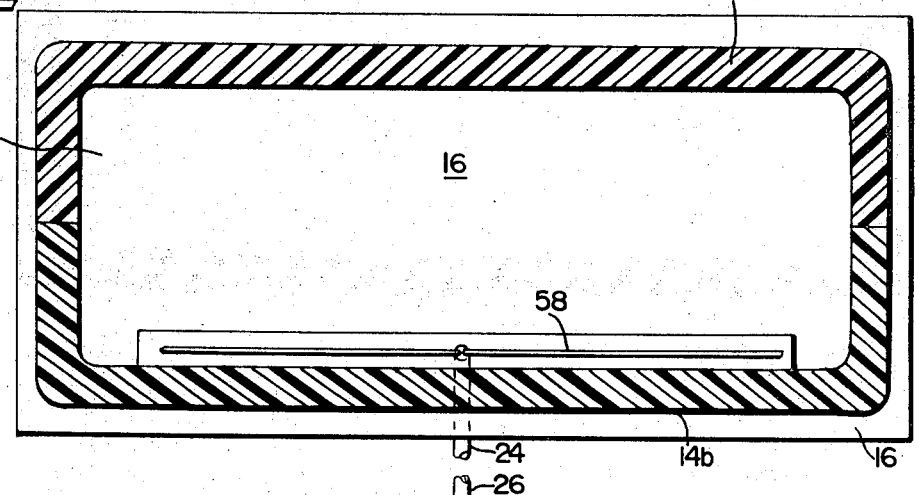
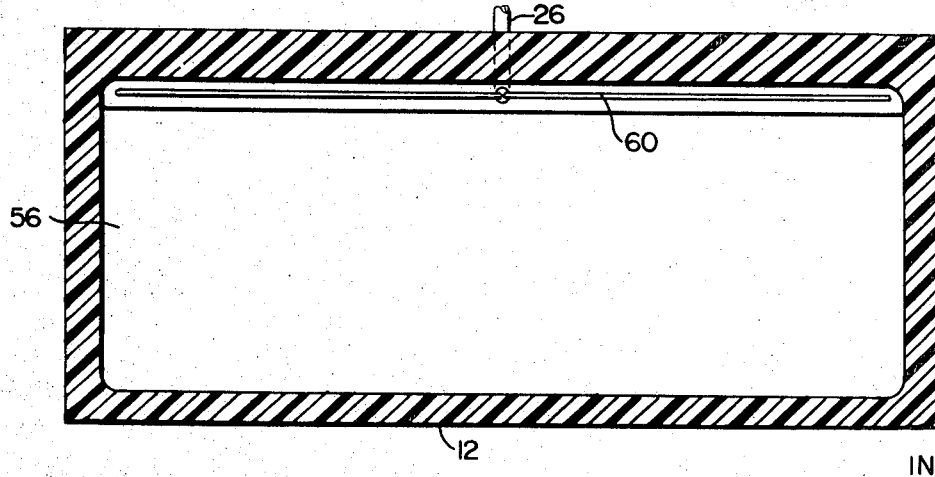

United States Patent Office 3,563,880
Patented Feb. 16, 1971

3,563,880
GEL ELECTROPHORESIS UNIT
Arthur W. Anderson, Dept. of Microbiology, Oregon State University, Corvallis, Oreg. 97331
Filed Aug. 28, 1968, Ser. No. 755,884
Int. Cl. B01d 13/02
U.S. Cl. 204—299   8 Claims

ABSTRACT OF THE DISCLOSURE

A gel electrophoresis cell having upper and lower buffer solution chambers containing oppositely charged electrodes. A gel containing slot extends between the chambers and coolant chambers are disposed on either side of the slot to control the temperature of the gel. The structure surrounding the slot is composed of mirror image members which mate on the plane of the slot in such a manner that, upon disassembly, the gel contained in the slot is presented for ready accessibility and removal of the gel.

BACKGROUND OF THE INVENTION

This invention relates generally to an apparatus for electrophoretic movement of suspended particles through a substance and particularly to such an apparatus for electrophoresis in a gel medium.

Gel electrophoresis units are known in the art and are in general use as a laboratory tool. Such units are utilized to separate particles suspended in a fluid-like material by differential migration of the components under the influence of an electric field. The particles, according to their electrical properties, migrate at different velocities under the influence of an electrical field and this difference in migration is utilized to provide separation, purification or analysis of such mixtures.

Electrophoresis units are used to analyze various substances such, for example, as proteins such as albumin, enzymes, hemoglobin, carbohydrates, blood serum, and the like; various inorganic ions and like substances. Devices may also be used in food laboratories for detection of adulteration, identification of toxins, effectiveness of pasturization, etc.

Electrophoresis units are generally made up of two spaced electrodes immersed in a buffer solution, the medium in which electrophoretic migration may take place disposed between and in contact with the electrodes or the buffer solution, and a specimen mixture disposed in the medium. An electric field is set up between the electrodes and the variously charged components or constituents of the specimen migrate toward the electrodes opposite in charge to the constituent charge. After exposure to an electric field for a period of time sufficient to enable suitable separation, the medium is subjected to qualitative and quantitative analysis.

Difficulties have been experienced in the prior art in that the rise in temperature in the medium attendant with the imposition of electric field thereacross has limited the amount of current and therefore the rate of migration permissible in the process. Furthermore, certain constituents such, for example, as labile enzymes, will be inactivated if the heat generated during electrophoresis becomes too high.

Prior art apparatus have also, in general, been relatively complicated and difficult to readily disassemble for access to the treated medium.

SUMMARY OF THE INVENTION

It is an object of this invention to overcome some of the disadvantages of the prior art by providing a novel gel electrophoresis unit, in which means are provided to control the temperature of the gel during electrophoresis.

This invention also provides a novel structure for gel electrophoresis units in which the apparatus may be readily disassembled for quick and simple access to the treated gel.

The invention also provides a gel electrophoresis apparatus in which a flat gel of variable thickness may be treated for either identification or preparatory work.

The invention also provides means to enable the placement of gels, following staining for total proteins, into the unit for electrical destaining.

The instant invention also provides an apparatus for gel electrophoresis which is more easily cleaned than prior art devices.

The above objects are achieved in a preferred embodiment of this invention by the provision of a gel electrophoresis unit having spaced upper and lower buffer solution chambers with an electrode disposed in each of the chambers; a gel containing slot extending between the chambers and coolant chambers disposed on either side of the slot; at least the upper buffer solution chamber, the coolant chambers and the slot being formed by a pair of mirror image members which mate on the plane of the slot; and threaded fastener means interconnecting the pair of members for ready disassembly thereof.

These and other objects of the invention will become better understood to those skilled in the art by reference to the following detailed description when viewed in light of the accompanying drawings wherein like components throughout the figures thereof are indicated by like numerals and wherein:

BRIEF DESCRIPTION OF THE DRAWINGS

FIG. 1 is a perspective view of an electrophoresis unit in accordance with the invention;

FIG. 1a is a view similar to FIG. 1 showing a component of the unit of FIG. 1;

FIG. 2 in an enlarged sectional view of the apparatus of FIG. 1 taken along the lines 2—2 thereof;

FIG. 3 is a sectional view of FIG. 2 taken along the lines 3—3 thereof;

FIG. 4 is a sectional view of FIG. 2 taken along the lines 4—4 thereof;

FIG. 5 is a sectional view of FIG. 2 taken along the lines 5—5 thereof; and

FIG. 6 is a sectional view of FIG. 2 taken along the lines 6—6 thereof.

DESCRIPTION OF THE PREFERRED EMBODIMENT

Referring now to FIG. 1 of the drawings, a gel electrophoresis unit in accordance with the invention, shown in perspective at 10, comprises a bottom container 12, a pair of mirror image members 14a and 14b and a top 16. The members 14a and 14b are connected by threaded fasteners 18a and 18b extending therethrough. Coolant inlets 20a and 20b and coolant outlets 22a and 22b are connected at either end of the members 14a and 14b, respectively. As referred to hereinafter, the respective components of the members 14a and 14b will be identified by a number suffixed by the appropriate letter.

Electrode connecting wires 24 and 26 extend from the top 16 and the bottom container 12 respectively.

Referring now to FIG. 1a of the drawings, the member 14a is illustrated in perspective. The member comprises vertical end walls 28a and 30a and a vertical side wall 32a.

An upper transverse wall 34a horizontally divides the interior area defined by the walls 28a, 30a and 32a forming therewith a portion of an upper buffer solution chamber indicated generally at 36a. The inner edges of the walls 28a, 30a and 34a, proximate their respective intersections, form mating surfaces 38a and 40a which cooperate with identical surfaces on the member 14b to provide a sealed, fluid-tight chamber within the walls when assembled as in FIG. 1. A gasket or other such seal can be provided to aid in the sealing, if desired.

For purposes to be described hereinafter, a shim of desired thickness can also be disposed on the mating surfaces 38a and 40a to expand the lateral dimensions of the device. In such cases, the shim will be formed to correspond to the plan form configuration of the mating surfaces. Bores 42a and 42b extend through the mating surfaces 38a and 40a for accommodating the bolts 18a and 18b respectively when the apparatus is assembled. A recess 44a, formed in the edge of the wall 34a, accommodates a vertical plate 46a. The plate 46a is preferably cemented to the facing surfaces of the recess 44a to provide means to maintain the assembly intact. A gel 48, which has been subjected to electrophoretic action, is disposed on the plate 46a.

FIG. 1a actually depicts the apparatus after electrophoretic action, indicating the disassembled configuration of the device with the treated gel presented for removal, analysis or the like. The lower edges of the side walls 28a and 30a are provided with channels 48a which cooperate with structure to be described hereinafter for keying of the components in assembly.

Referring now more particularly to FIGS. 2 and 3, the structure of FIG. 1 is shown in side sectional elevation. A second transverse wall 50a forms a bottom of the member 14a and, in cooperation with the transverse wall 34a and end and side walls 28a through 32a, defines a cooling chamber 51a. The coolant inlet 20a and outlet 22a terminate in nozzles 52a and 54a, providing communication with the chamber 51a. The coolant outlet nozzle 54a is provided with an upwardly sloping extension terminating in the cooling chamber 51a, proximate the transverse wall 34a to provide means to withdraw cooling fluid from the warmer areas of the chamber.

When the device is assembled, the lower transverse walls 50a and 50b also define, in conjunction with the bottom container 12, a lower buffer solution chamber 56. The electrode connecting wires 24 and 26 terminate in electrodes 58 and 60 which are disposed in the upper and lower buffer solution chambers 36 and 56, respectively. As best seen in FIG. 3, the top surface of the wall forming one side of the container 12 is provided with a key-groove configuration 62 which cooperates with a corresponding key-groove configuration in the bottom of the wall 32b of the member 14b. The opposite wall of the bottom container 12 is provided with a channel 64 which receives the forward edge of the side wall 32a of the member 14a. As illustrated, the vertical front surface of the channel 64 is spaced from the forward edge of the side wall 32a to provide for expansion of the device as will be described in greater detail hereinafter. The aforedescribed key-groove configuration provides interlocking of the assembled members 14a and 14b and the bottom container 12, in conjunction with an interlocking of the aforedescribed channels 48a and 48b in the side walls 28a and 28b and 30a and 30b, as best seen in FIG. 2, to prevent lateral and transverse movement of the assembled members 14a and 14b with respect to the container 12. The top 16 and the upper surface of the side wall 32b are similarly provided with a key-groove arrangement 66 which, in conjunction with the depending portion 68 on the top 16 cooperating with the end and side walls 28a and 28b through 32a and 32b, keys the top 16 to the assembled members 14a and 14b. Obviously, any other suitable mechanical keying or interconnecting structure can be substituted for that specifically described without exceeding the scope of the invention.

Referring now to FIGS. 4, 5 and 6, the assembled unit is shown in a series of horizontal sections, illustrating in detail the disposition and relationship of the plates 46a and 46b containing the gel 48 and the electrodes 58 and 60.

It should be noted that the unit is arranged so that the electrodes 58 and 60 are at points equidistant from the gel 20 so the electrical field imposed thereacross is uniform.

In operation, the gel is first placed between the plates 46a and 46b and, as best seen in FIG. 1a, is disposed in the slot 44a of the member 14a. The gel may be pre-injected or post injected with the specimens to be subjected to electrophoretic action. The gel forming liquid is preferably allowed to gel within the assembly while disposed in a horizontal position prior to full assembly of the device. The members 14a and 14b are then assembled and connected with the threaded connectors 18a and 18b disposed through the bores 42a and 42b. The lower buffer solution chamber 56 is then filled with a suitable buffer solution. For the purposes of this invention, the solution may be of any of the electrical conducting solutions usually called buffers, known to those skilled in the art of electrophoresis. The gel may comprise a liquefied agar, a hydrolyzed starch solution, a hydrophilic monomer solution, or other gel forming liquid.

After disposition of the components of the device in the fully assembled condition with buffer solution disposed in the chambers 36 and 56, circulation of the coolant fluid through the coolant inlet and outlets 20a and 20b and 22a and 22b, respectively, is initiated. The electrodes 58 and 60 are connected to a suitable source of electric current through the connecting wires 24 and 26 and an electric field is thereby induced through the gel 48 and electrophoretic action commences. Preferably the lower electrode 60 is connected as the negative pole, with the electrode 58 as the positive pole. Current required may be furnished by a suitable source of DC power, which may range, for example, from 10 to 200 milliamps and up to 500 volts. The suspended, charged particles will then, under the influence of the electrical field, migrate to the oppositely charged pole. The temperature or the rate of flow of the coolant fluid flowing through the chambers 51a and 51b can be regulated to control the temperature in the gel 48 during electrophoresis as desired.

By changing the thickness of the plates 46a and 46b, the resultant thickness of the gel 48 can also be regulated as desired; however, since these plates are generally cemented in, thickness of the gel is preferably increased through expansion of the lateral dimension of the device by adding shims of desired thickness between the members 14a and 14b during assembly thereof. In this respect, the spaced relationship between the front surface of the channel 64 and the forward edge of the side wall 32a shown in FIG. 3, accommodates this lateral expansion.

The device is preferably fabricated from a transparent material such, for example, as Lucite (methyl methocrylite) with the plates 46a and 46b being fabricated from Pyrex or conventional glass, so that the progress of the electrophoresis can be observed through the unit walls.

After the elapse of a suitable predetermined time or when the electrophoresis has progressed to the desired point, the current to the electrodes 58 and 60 is terminated and the unit then is disassembled. In disassembly, the top is removed and the assembled units 14a and 14b are lifted from the bottom container 12. By removing the threaded fasteners 18a and 18b, the members 14a and 14b are separated so that the gel is presented for analysis and/or removal as shown in FIG. 1a.

This invention thereby provides an electrophoresis unit having cooling means for controlling the temperature of a gel during electrophoretic action. The cooling means also permits the use of higher current levels to provide more uniform, better controlled and more rapid migration, thereby allowing comparisons of such factors as R values for different proteins. Maintenance of temperature also avoids the inactivation of labile enzymes by the heat generated during the electrophoretic action.

By providing separation of the unit at the gel containing section, the gel is presented for ready access on disassembly of the unit. Gels, following staining for total protein, can also be placed easily in the unit for electrical destaining. The unit provided is furthermore simpler to use than existing devices and is much easier to clean.

What has been set forth above is intended primarily as exemplary of a teaching of the invention to enable those skilled in the art in the practice thereof. It should therefore be understood that, within the scope of the appended claims, the invention may be practiced other than as specifically described.

What is claimed is:

1. A gel electrophoresis cell comprising:
 spaced upper and lower buffer solution chambers;
 electrode means disposed in each of said chambers;
 means defining a gel containing slot extending between said cells and communicative therewith;
 coolant chamber means, including conduiting communicative with the source of coolant, disposed on either side of said slot;
 at least said upper chamber, said coolant chambers and the structure defining said slot, being formed of mirror image members which mate on the plane of said slot; and
 means to releasably connect said members.

2. An apparatus in accordance with claim 1 wherein said means to releasably connect said members comprises at least one threaded fastener extending between said members.

3. An apparatus in accordance with claim 1 wherein said lower buffer solution chamber comprises an open container having upstanding walls to receive said members.

4. An apparatus in accordance with claim 3 wherein at least one of the lower peripheral edge of said members is formed with a key-groove formed thereon and wherein the upper surface of said upstanding walls is provided with a mating key-groove thereon to thereby lock said members against lateral displacement with respect to said container.

5. An apparatus in accordance with claim 4 wherein a removable plate is disposed across the mating surface of each of said members defining said slot to thereby form the vertical boundaries of said slot and to provide removable separation between said slot and said coolant chambers.

6. An apparatus in accordance with claim 5 wherein said upper chamber further comprises a removable top cooperating with the upper surfaces of said members to form an enclosed chamber therewith.

7. An apparatus in accordance with claim 6 wherein the electrode in said upper chamber is mounted in said top.

8. An apparatus in accordance with claim 1 wherein said cell is constructed of transparent material.

References Cited

UNITED STATES PATENTS

| | | | |
|---|---|---|---|
| 3,118,829 | 1/1964 | Raymond | 204—299 |
| 3,129,158 | 4/1964 | Raymond et al. | 204—180 |
| 3,326,790 | 6/1967 | Bergrahm | 204—180 |
| 3,374,166 | 3/1968 | Raymond | 204—299 |
| 3,384,564 | 5/1968 | Oranstein et al. | 204—180 |

JOHN H. MACK, Primary Examiner

A. C. PRESCOTT, Assistant Examiner